United States Patent [19]
Willbanks

[11] Patent Number: 5,703,995
[45] Date of Patent: Dec. 30, 1997

[54] METHOD AND SYSTEM FOR PRODUCING A PERSONALIZED VIDEO RECORDING

[76] Inventor: George M. Willbanks, 2999 Comfort Rd., New Hope, Pa. 18938

[21] Appl. No.: 649,223

[22] Filed: May 17, 1996

[51] Int. Cl.$^6$ .............................. H04N 5/93; G11B 27/00
[52] U.S. Cl. ................................... 386/52; 386/56
[58] Field of Search ........................ 386/46, 52, 55, 386/53, 54, 56, 4, 13, 32; 260/13, 15; H04N 5/93; G11B 27/00

[56] References Cited

U.S. PATENT DOCUMENTS

| | | | |
|---|---|---|---|
| 3,571,528 | 3/1971 | Smith | 179/100.2 |
| 4,009,331 | 2/1977 | Goldmark et al. | |
| 4,314,285 | 2/1982 | Bonner et al. | |
| 4,319,286 | 3/1982 | Hanpachem | |
| 4,602,279 | 7/1986 | Freeman | |
| 4,602,297 | 7/1986 | Reese | |
| 4,725,327 | 2/1988 | Matuda et al. | 156/351 |
| 4,782,401 | 11/1988 | Faerber et al. | |
| 4,863,384 | 9/1989 | Slade | |
| 5,099,337 | 3/1992 | Cury | 386/46 |
| 5,099,422 | 3/1992 | Foresman et al. | |
| 5,233,654 | 8/1993 | Harvey et al. | |
| 5,278,662 | 1/1994 | Womach et al. | 386/46 |
| 5,282,186 | 1/1994 | Yoshio et al. | |
| 5,301,172 | 4/1994 | Richards et al. | |

*Primary Examiner*—Robert Chevalier
*Attorney, Agent, or Firm*—Dann, Dorfman, Herrell and Skillman, P.C.

[57] ABSTRACT

A system for mass-producing customized video recordings is provided with a plurality of video recording devices under the control of a central controller having access to a database of information pertaining to individuals for whom the recordings are to be made. The customized recordings are made by inserting personalized information within videotapes having pre-recorded information common to all of the customized recordings. The insert locations are signified by a predetermined video signal, such as a monochromatic or black video signal. During customization, a playback signal from each pre-recorded videotape is monitored to detect the presence of the predetermined video signal to locate successive insert locations. When an insert location is detected, the tape is cued to the first video frame of the insert location and the customization information is retrieved and recorded on the tape to replace the predetermined signal.

20 Claims, 2 Drawing Sheets

METHOD AND SYSTEM FOR PRODUCING A PERSONALIZED VIDEO RECORDING

FIELD OF THE INVENTION

The present invention is directed to a system for producing personalized video recordings.

BACKGROUND OF THE INVENTION

Many businesses desire to produce video recordings which may contain, for example, specifically targeted advertising or instructional information. Presently, such video recordings are mass produced, and each recording typically contains the same information. Hence, general information about the product or service is selected to appeal to the average consumer who will view the video recording. As a result, there may be certain aspects of the advertised product or service which are depicted on the video recording, but which do not appeal to a particular individual. Conversely, information that may be of interest to a particular individual may be omitted from the recording. In the case of an instructional video recording, the instructions may be general in nature and not address special situations or conditions pertaining to a particular individual. A potential customer will lose interest in a product or service if the video recording emphasizes features or services which are not important to the consumer, or if the recording omits other features which are important and are provided by the advertiser. In either case, a lost sale is likely to result.

A personalized video recording would provide additional consumer appeal and make the consumer feel important by providing specific information directed to the particular consumer's needs. The personalized video recording would desirably be tailored to a consumer with particular interests and would inform the consumer of facts which may be important to him or her. A personalized video recording would desirably address the consumer by name in order to promote a perception of personal attention directed by the advertiser. If a consumer can personally relate to the information on the video, he or she may be more inclined to purchase the marketed product or service. Therefore, if a personalized video recording can be mass produced at an acceptable cost and quality, a business's sales could be significantly increased.

While there are known methods for producing personalized video recordings, such methods are time consuming and costly. To produce such a video normally can cost $70.00 to $150.00 per tape. Such costs are generally out of the budget range of a small business that desires to mass mail video recordings. For that reason, it has not been possible to provide personalized video recordings on a mass basis for general retail items.

The known systems for producing personalized video recordings leave much to be desired. Typically, a quantity of tapes are each prerecorded with a sequence of scenes that are common to all of the customized recordings. Interspersed among the common scenes are blank portions of tape where the various selected individualized scenes are to be inserted. One of the known systems inserts the custom information by playing the prerecorded tape. The individualized scenes are played back at intervals timed to coincide with the insertion locations on the prerecorded tape, and recorded onto the prerecorded tape at the appropriate intervals. However, in these systems, the tape may be initially positioned at its rewind point or at a slightly different place or frame start point. The initial positioning of the tape may vary by as much as 10 to 30 frames. The resulting inaccuracy in synchronizing the playback of the selected information with the insertion locations, results in gaps or other undesired effects that are noticeable to the viewer of the produced recording.

In another known system for automating the production of customized video tapes a time code is added to the master recording for the preduplicated tapes. Adding such a time code requires the use of recording equipment that is specifically adapted to the particular personalization system, and hence is unappealing to an organization that desires to produce its own master recording using standard recording equipment. A further known method employs one of the audio channels for encoding time information, rendering that audio channel unavailable for recording sound. In still other systems, only one type of feature such as voice, music, still video or motion video, can be recorded onto a preduplicated tape during each playback of the preduplicated tape.

SUMMARY OF THE INVENTION

In accordance with the present invention, there is provided a method and system for mass production of personalized video recordings. The system utilizes preduplicated video recordings produced by standard recording methods. The system of the invention locates predetermined personal information insert locations within each of the preduplicated recordings within a positional accuracy of a single recorded frame. The system is adapted to mass produce personalized video recordings in which each video recording can be uniquely customized to include selected video effects titling, voice, still images, full-motion images, and/or music.

The system comprises one or more video edit decks that are each connected with respective recording process controllers. Each process controller monitors a control track output of its associated edit deck during playback of a preduplicated recording. The present control track value is compared with one or more predetermined control track values representing the approximate personal information insert locations within the preduplicated recording. The process controller is provided with a video frame detector and digitizer that is configured to conduct a statistical comparison of the video image signal with a predetermined statistical criterion defining an insert location. By detecting insert locations according to a predetermined video image pattern, the system of the invention allows a user to produce the preduplicated recordings using standard video recording equipment and techniques.

As playback of the preduplicated recording proceeds in the approximate vicinity of an insert location, as determined according to the control track value, the process controller responds to the frame detector and digitizer by stopping playback, recording the insert frame location in memory, and rewinding the preduplicated recording by a predetermined distance or number of frames. Then, playback of the preduplicated recording is resumed, and the process controller synchronizes playback of selected personalized video and/or audio information to coincide within one frame of the beginning of the recorded insert location.

According to another aspect of the invention, a computer control network is provided for a plurality of process controllers in order to simultaneously configure and control the production of personalized video recordings within a plurality of edit decks. These and other aspects and advantages of the present invention shall be made apparent in the following detailed description of the preferred embodiments.

BRIEF DESCRIPTION OF THE DRAWINGS

The foregoing summary, as well as the following detailed description of preferred embodiments, will be better understood when read in conjunction with the appended drawings in which.

DETAILED DESCRIPTION OF THE PREFERRED EMBODIMENTS

The preferred embodiments of the invention shall be described first with reference to the physical organization and interconnection of the various components and subsystems, and then to the coordinated operation of the components and subsystems in the automated mass production of customized and/or personalized video recordings.

Organization of System Components

Figure 1:
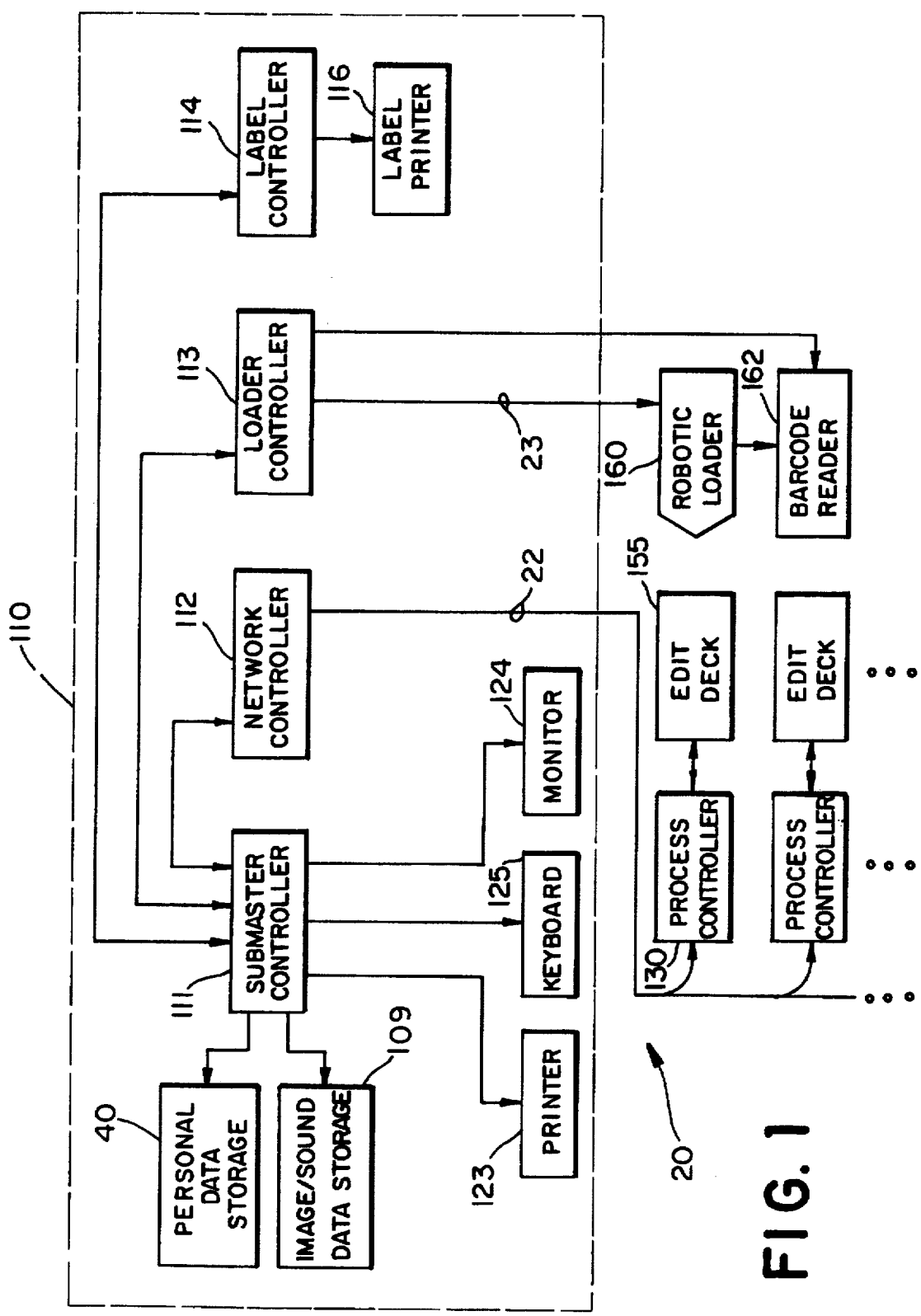
FIG. 1 is a functional block diagram of a personalized video recording system of the invention.

Referring to FIG. 1, there is shown a block diagram of a system 20 for inserting customized or personalized information into preduplicated video tapes in accordance with the present invention. The system 20 comprises a master controller 110; a plurality of process controllers, of which process controller 130 is exemplary; a plurality of video tape edit decks, of which deck 155 is exemplary; and a robotic videotape deck loader 160 having an attached barcode reader 162. The components of the master controller 110 coordinate the operation of system 20 by storing personal data, accepting user input, operating the robotic loader 160, and providing image and sound data to the process controllers via a data network 22. The process controller 130, in turn, controls operation of videotape edit deck 155, detects insert locations for customized information within preduplicated videotapes, and provides the customized video and audio information to be recorded onto the preduplicated videotapes at the insert locations.

The master controller 110 includes four functional subsections: a submaster controller 111, a network controller 112, a loader controller 113, and a label controller 114. Each of the controllers 110–114 includes a microprocessor card having two serial ports, one parallel port, a hard disc controller and a hard disc drive. The submaster controller 111 has, in addition to the above components, a display monitor 124, and a keyboard 125.

The network controller 112 has a 4 GB or larger hard disk drive and controller, and a network interface card that supports local area network 22.

The loader controller 113 has an EIA-232 interface 23 for transmitting commands to the robotic loader 160. The loader controller 113 further includes a communication interface for receiving data from the barcode reader 162.

The robotic loader 160 is connected to receive directions from the loader controller 113 to extract a preduplicated tape from a supply hopper of tapes (not shown) and to insert the tape into a specified tape edit deck. After processing, the personalized tape is retrieved by the loader 160 and placed into an output hopper (not shown). The robotic loader 160 receives a unique barcode signal from each preduplicated tape through a barcode reader 162 located on the robotic loader 160. A unique sequential barcode label is placed on the spine of each preduplicated tape before it is placed in the supply hopper of system 20.

The master controller 110 also includes a personal data storage device 40, connected with the submaster controller 111, for storing personal information pertaining to each of a plurality of individuals. The personal data storage device can be embodied as a hard disk drive connected with the submaster controller 111. Alternatively, the personal data storage device may be embodied as a magnetic tape drive, an optical disk drive, or other mass storage device for digital data.

The personal information is obtained from company or individual supplied databases, "800" telephone services, mail order or local retail establishments. In the preferred embodiment, personal information is obtained by scanning documents containing the personal information which have been completed by an interested individual or by a third party. Alternative methods for obtaining personal information include downloading information into the data storage device by using a communications device, such as a modem. The information may be transmitted by modem to the master controller 110 at predetermined times during the day or on a continuous basis. As a further alternative, the information may be directly entered into the master controller 110 via keyboard 125.

The personal information stored within the personal data storage device 40 includes information which is pertinent to customizing a particular video advertisement. For example, the personal information can include an individual's name, address, phone number, gender, interests, hobbies, or other information which relates to the customizable aspects of the video to be targeted to the individual or to a class of similar individuals.

Figure 2:
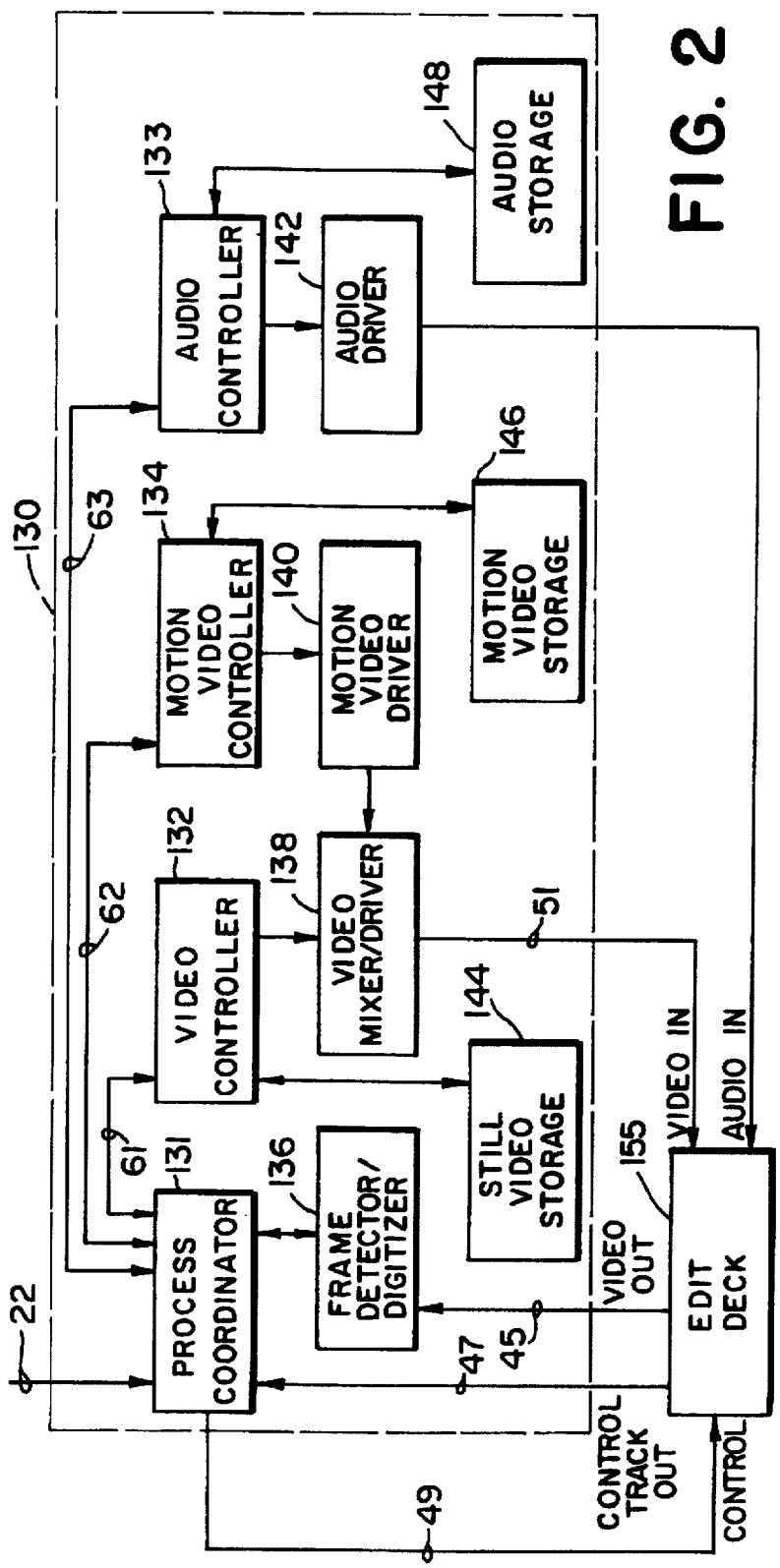
FIG. 2 is a functional block diagram of a process controller employed in the system shown in FIG. 1.

Referring now to FIG. 2, the process controller 130 is shown in greater detail. Process controller 130 includes four functional sections: a process coordinator 131, a video controller 132, an audio controller 133, and a motion video controller 134. Process coordinator 131, video controller 132, and audio controller 133 preferably includes a 486DX 100 MHz microprocessor board with an ISA bus. The video controller 132, audio controller 133 and motion video controller 134 are connected to the process coordinator 131 by respective EIA-232 serial communication lines 61, 62 and 63.

The process coordinator 131 coordinates the functions of the controllers 132–134, and the edit deck 155. The edit deck 155 communicates with the process coordinator 130 by sending control track data to the process coordinator via CONTROL TRACK OUT signal line 47. The edit deck 155 receives control signals from the process coordinator via CONTROL signal line 49. In the preferred embodiment, the edit deck 155 is realized by a JVC model BR-S800U edit deck or a JVC model BR-S822U edit deck. Each of those models has an EIA-232 data interface for connecting with the process coordinator 131 to communicate control track information and status information thereto and to receive operating control signals therefrom.

The process coordinator 131 is further connected with a frame detector/digitizer 136, such as a "SCENE STEALER" automatic scene detector/logger manufactured by Dubnet International Inc. of Westwood, N.J. The frame detector/digitizer 136 is adapted to receive a video signal (VIDEO OUT) from the edit deck 155 via signal line 45 and to digitize the image portion of the video signal. The frame detector digitizer 136 performs a comparison of the digitized image signal with a predetermined criterion to detect insertion locations for the customized information in the preduplicated video tape. The decision criterion employed by the frame detector/digitizer 136 is configured by the process coordinator 131 when the system is initialized. More particularly, the frame detector/digitizer 136 is configurable to detect the presence of a predetermined pattern, such as a predetermined threshold proportion of a monochromatic signal, within the image portion of the digitized video signal. In the preferred embodiment, the frame detector/digitizer 136 is programmed to transmit an insert detection signal to the process coordinator 131 whenever the "black" content of the present frame of the video image exceeds a predetermined proportion of the total image. This comparison is performed by summing, averaging, or obtaining an equivalent statistical measure of the pixel values representing the present image frame, or a portion thereof, and then comparing the resulting statistical value with the selected threshold or limit value.

The video controller 132 is configured for providing segments of video information to the edit deck 155 when instructed to do so by the process coordinator 131. The video controller 132 is connected with a still video image storage device 144, which includes a digital mass data storage device such as a hard disk, CD-ROM, or the like. The video controller 132 is further operatively connected with a video mixer/driver 138, such as a Truevision "TARGA 64" video card. The video mixer/driver 138 is configured for adding text characters or various special effects to the custom video signal in response to commands from the video controller 132. The video mixer/driver produces a video signal (VIDEO IN) that is provided to the edit deck 155 via line 51.

The motion video controller 134 preferably includes a "PENTIUM" 100 MHz microprocessor board with a PCI bus and an ISA bus, and further includes a motion video signal driver 140, such as a Mattfox Marvel II Video board. The motion video driver 140 provides a motion video input to the video mixer/driver 138. If an application calls for motion video at an insert location, the video signal from the video controller 132, if any, can be superimposed with the motion video signal from the motion video driver 140.

The audio controller 133 is configured for providing audio signals to the edit deck 159. The audio controller 133 is connected with an audio storage device 148, which includes a digital mass data storage device such as a hard disk, CD-ROM, or the like. The audio storage device 148 stores audio information, such as voice or music, in digital form. The audio controller 133 is configured to retrieve digital audio files from the audio storage device 148 and, if desired, to perform a manipulation of the retrieved audio files, such as concatenating words or phrases, prior to providing the audio files to an audio driver 142. The audio driver 142 is connected to receive digital audio information from the audio controller 133, and to convert the received digital audio information into a signal format compatible with the AUDIO IN signal input requirements of the edit deck 155.

System Operation

Figure 3:
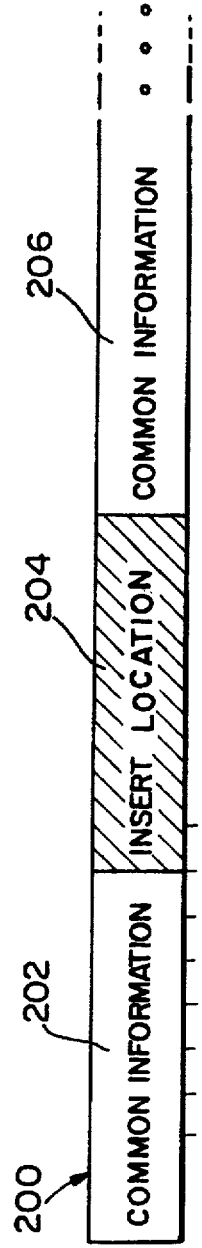
FIG. 3 is a time sequence diagram of a preduplicated video recording used in the system of FIG. 1.

Operation of the system shall now be described with reference to FIG. 3 wherein there is shown a diagram of a preduplicated video recording 200 having a series of scene intervals 202, 204 and 206. The preduplicated recording 200 begins with scene interval 202, which contains prerecorded information common to all of the preduplicated recordings, such as an introduction. Following scene interval 202 is scene interval 204, which is an insert location where personalized information can be inserted. Following scene interval 204 is scene interval 206, which contains additional prerecorded information. The preduplicated recording 200 is produced in advance by the user employing standard video recording equipment.

The scene interval 204 is characterized as an insert location by recording a predetermined image, such as a black image, for the desired length of the insert location. For example, if the recording 200 is produced to promote a resort facility, then scene interval 204 is reserved for insertion of information pertaining to an available recreational activity that is selected from several recreational activities. The selection is made according to the personal preferences of the customer or potential customer to whom the tape will be sent.

In addition to preparing the preduplicated video recording, the system user also prepares the selections of custom information, such as a library of audio tracks, still images, motion video sequences, and/or caption data from which selections will be made for insertion into the insert location. The custom information is stored in the image and sound data storage device 109 in the master controller 110 shown in FIG. 1. Alternatively, the custom information is stored in the appropriate storage device associated with the still video, motion video, or audio controllers (132, 134, 133) in process controller 130 shown in FIG. 2.

When a supply of preduplicated tapes is made, the user also creates a script for the personalizing system. The script specifies the control track locations of the insert locations in the preduplicated recording, and also specifies the selections of audio or image data that are to be associated with various options among the personal data. For example, in the resort promotion discussed above, the user may specify that when the personal data indicates that the customer enjoys gymnastics, then audio and/or image information pertaining to the resort's gymnastic facilities is selected to be recorded at the insert location. If the personal data indicates that the customer enjoys sailing, then audio and/or image information pertaining to the resort's sailing facilities is selected to be recorded at the insert location. When the script and the supply of prerecorded tapes has been provided to the system, then production proceeds on an automated basis.

The submaster controller 111 (FIG. 1) first obtains one or more records of personal data from the personal data storage device 40. The submaster controller 111 processes the personal data in accordance with the script, and determines, for each personal data record, the selections of audio and/or image data that are to be recorded at each insertion location. The submaster controller 111 transmits, for each personal data record, a production message to one of the process controllers identifying the control track values of the insert locations, and identifying the selections of custom information to be recorded at each of the insert locations. In the preferred embodiment, the submaster controller 111 transmits as many as 30 such messages in a single batch to one of the process controllers, which then proceeds to produce thirty personalized recordings. Additionally, the submaster controller 111 downloads the required custom image and/or sound data to the appropriate process controller if such data is not already stored in the still video, motion video, or audio storage devices of the process controller.

When a production message is received by the process coordinator 131, the process coordinator 131 queries the edit deck 155 to determine whether a preduplicated tape has been inserted and is ready for processing. If a tape is ready in the edit deck 155, then the process coordinator 131 instructs the edit deck 155 to roll the tape, in a standard play, shuttle play, or fast forward mode, while the process coordinator 131 monitors the control track output 47 of the edit deck 155.

As the edit deck 155 approaches a control track value corresponding to the control track location of the first insert location specified in the script, the edit deck 155 is operated in a standard play mode. The process coordinator 131 monitors the output of the frame detector/digitizer 136 for a detection signal produced by the frame detector/digitizer 136 when the predetermined characteristic image of the insert location is detected. In the preferred embodiment, the characteristic image is one having a "black" content in excess of a predetermined proportion of an entire frame. When the process coordinator 131 receives the detection signal, then operation of the edit deck 155 is immediately stopped and reversed for a predetermined number of frames defining a "pre-roll interval." Then, the process coordinator 131 commands the edit deck 155 to begin to play, and the process coordinator 131 counts down the number of frames in the video signal as the insert location approaches.

During the pre-roll interval, the process coordinator 131 instructs the video controller 132, motion video controller 134, and/or audio controller 133 to prepare the selected image and/or audio data for recording by the edit deck 155 in accordance with the present production script. For example, if a still video image is required, then the process coordinator 131 instructs the video controller 132 to obtain the selected still video image and to load the image into the video mixer/driver 138. The selected still video image may be stored in the still video storage device 144 for independent retrieval by the video controller 132, or may be downloaded from the central image/sound data storage device 109 via the submaster controller 111, network controller 112, and process coordinator 131. In any case, the video controller 132 obtains the selected still video image, and signals the video mixer/driver 138 to produce the desired still video signal. Additionally, if any caption information is to be associated with the inserted image, the process coordinator 131 transmits the caption data to the video controller 132 which, in turn, configures the video mixer/driver 138 to superimpose the desired caption text onto the video signal provided to the edit deck 155.

Similarly, if motion video is desired at the insert location, then the process coordinator 131 instructs the motion video controller 134 to retrieve the selected motion video sequence and to prepare the motion video driver 140 to play the selected motion video sequence. Lastly, if an audio selection is desired at the insert location, then the process coordinator 131 instructs the audio controller 133 to retrieve the selected audio file or files, and to configure the audio driver 142 to play the selected audio information.

As the audio controller 133 obtains the selected audio information specified by the script, the audio controller may mix or concatenate multiple audio files to provide a "voice-over" combining music and speech, or to construct a customized phrase or sentence. For example, the script may specify that the targeted individual is to be greeted during a custom insert. In order to construct the greeting, the audio controller 133 may obtain a salutation file containing the phrase "Hello" and a name file containing a spoken name, such "John". During the pre-roll interval, the audio controller 133 concatenates the salutation and the name to produce the phrase "Hello John". The audio files are provided within the audio storage device 148, or may be downloaded to the audio controller from the master controller when a batch of instructions is downloaded to the process coordinator. Alternatively, to reduce storage requirements within the process controller 130, the audio controller 133 may request and receive the specified selected information during each pre-roll interval. Similar trade-offs between distributed storage capacity and the data transmission capacity of the network 22 can be made in connection with the other custom information controllers 132 and 134.

As noted above, the video controller 132, motion video controller 134, and audio controller 133, are prepared to provide the selected image and/or audio information during the pre-roll interval. When the process coordinator 131 has reached the end of the countdown of frames just prior to the insert location, the process coordinator signals the video controller 132, the motion controller 134, and the audio controller 133 that the desired insert location has been reached, and the respective controllers respond by providing respective VIDEO-IN and AUDIO-IN signals to the edit deck 155. Simultaneously, the edit deck 155 is switched from a play mode to a record mode, in order to receive the selected information and to record the selected information onto the preduplicated video recording within a single frame of the beginning of the insert location. As can be appreciated, by detecting the beginning of the insert location in accordance with the image content of the preduplicated video tape, and by synchronizing the insertion of the selected information to the edit deck to coincide with the beginning of the insert location, the problems associated with frame positioning inaccuracy of prior art systems, are substantially overcome.

After the selected personal information has been recorded at the insert location, the process coordinator 131 instructs the edit deck 155 to cease recording and to resume playback mode for advancing the recording to the next insert location specified in the script. When the final scene of personalized information has been inserted into the last insert location, then the process coordinator 131 instructs the edit deck 155 to rewind the recording. After the recording is rewound, the process coordinator sends a message, via data network 22, to the submaster controller 111 that the requested recording has been completed. The submaster controller 111, in turn, instructs the loader/controller 113 to operate the robotic loader 160 to retrieve the recording from the edit deck 155. As the completed recording is retrieved by the robotic loader 160, the submaster controller transmits personal indicia pertaining to the recording, such as the targeted individual's name and address, to the label controller 114. The label controller 114 responds by printing a label, such as an adhesive mailing label, on a label printer 116. The robotic loader 160 then removes the completed recording from the edit deck 155, delivers the completed recording to the label printer 116 for application of the label, and then deposits the labeled recording in an output hopper.

Because the system of the present invention identifies insert locations on the basis of a predetermined, characteristic video image in the vicinity of a specified control track location, the preduplicated recording does not contain image information in the vicinity of the insert location that would be mistaken for the predetermined insert image. For example, if the predetermined image is an image containing a specified "black" content, then the threshold black content should not be exceeded within a distance about the insert location corresponding to the control track position accuracy. In some situations, it may be desirable to provide scene transition effects, such as fades or wipes, between the common information scenes and the custom information scenes. For example, referring to FIG. 3, it may be desired to provide a fade-out between scene interval 202 and scene interval 204, and to provide a corresponding fade-in between scene interval 204 and scene interval 206. However, if the fade-out of the scene in interval 202 is originally recorded onto the preduplicated tape, then the positional accuracy advantage provided by the otherwise abrupt transition to black at the beginning of the insert interval 204 will be lost.

One way to provide scene transition effects is to include portions of the common information within the selected insertion information, and to generate the desired transition effect during the recording of a custom insert sequence. For example, the last frame of the scene in interval 202 may be initially stored within the image database in storage device 109 or 144 prior to production of the personalized recording. Then, when the insert location is reached during production, the video controller 132 obtains both the stored frame of the scene in interval 202 and the selected custom image. During recording of the personalized information in the insert location, the video controller 132 first supplies the stored frame of scene 202 to the video mixer/driver 138, and instructs the video mixer/driver 138 to perform the desired transition effect, such as a fade from the stored frame of the scene in interval 202 to the selected custom video scene. Similarly, the first frame of the scene in interval 206 is provided in advance within an accessible storage device in order to allow the video controller 132 to provide the desired transition effect at the end of the custom scene insertion. As can be appreciated, selected transition effects can be provided for transition between still video or motion video insert sequences.

The terms and expressions which have been employed herein are used as terms of description and not of limitation. There is no intention in the use of such terms and expressions of excluding any equivalents of the features shown and described or portions thereof. It is recognized, however, that various modifications are possible within the scope and spirit of the invention as claimed.

That which is claimed is:

1. A system for locating an insert location within a video prerecording and inserting personalized information therein, comprising:

a personal data storage device for storing personal data pertaining to each of a plurality of individuals;

a custom information storage device for storing a plurality of different images;

a master controller connected with the personal data storage device for selecting one of said stored images to be recorded at an insert location on a video recording, said image being selected with reference to personal data pertaining to one of said plurality of individuals;

an edit deck for receiving the video prerecording, said edit deck having a control terminal for receiving operation control signals, a video output terminal for providing a video output signal, and a video input terminal for receiving a video input signal; and a process controller connected with the control terminal for providing operation control signals to the edit deck, said process controller including a video digitizer for digitizing successive prerecorded images on the video prerecording and for detecting an insert location by comparing successive digitized video images with a predetermined statistical criterion that is indicative of an insert location, said process controller being responsive to the master controller for retrieving the stored images and for providing the retrieved image to the video input terminal when an insert location has been detected.

2. The system of claim 1 wherein the process controller is connected for receiving a control track signal from the edit deck and wherein the process controller is configured for responding to the digitizer when the control track signal corresponds to a specified value indicating the proximity to a predetermined insert location.

3. The system of claim 2 wherein the process controller is configured for signalling the edit deck to reverse operation of the edit deck for a predetermined interval after the insert location is detected, and for signalling the edit deck to resume forward operation so as to advance the preduplicated recording toward the insert location prior to providing the selected image to the video input terminal.

4. The system of claim 1 wherein the preduplicated video recording is a video tape and the edit deck is a video tape editing deck.

5. The system of claim 1 wherein the custom information storage device is configured for storing a plurality of audio tracks, full motion video sequences, and still video images to be recorded at an insert location.

6. The system of claim 5 wherein the process controller is configured for retrieving one or more of said audio tracks, full motion video sequences, and still video images, and for combining selected ones of said audio tracks, video sequences and still video images for simultaneous recording by the edit deck at the insert location of the preduplicated recording.

7. The system of claim 2 wherein said digitizer is configured for establishing said criterion as a predetermined proportion of a video image exceeding a selected threshold monochromatic content.

8. The system of claim 1, comprising a robotic loader for loading the preduplicated recording into the edit deck and for retrieving the preduplicated recording from the edit deck after the personalized information has been recorded thereon.

9. The system of claim 8 wherein the master controller comprises labeling means for labeling the personalized recording with personal data identifying the individual for whom the recording has been personalized, and said robotic loader is configured to deliver the personalized recording to the labeling means.

10. The system of claim 6 wherein the process controller comprises a video controller having a video driver connected to the video input terminal of the edit deck for providing a desired scene transition effect between the selected image and a prerecorded scene on the preduplicated recording.

11. A method for producing customized video recordings, comprising the steps of:

providing a plurality of preduplicated recordings, each preduplicated recording having a sequence of common scenes separated by an insert location having an identifying image that is replaceable with a custom image;

storing a plurality of custom images in an image storage device;

collecting personal data pertaining to each of a plurality of individuals;

correlating the personal data with the custom images to associate one of said custom images with one of said individuals and with one of the insert locations;

playing one of the preduplicated recordings;

detecting said identifying image during said playing step, whereby said insert location is located; and recording said one of said custom images onto the insert location of the preduplicated recording in response to the detection of said identifying image.

12. The method of claim 11 wherein said detecting step comprises:

receiving a video signal from the preduplicated recording;

digitizing an image portion of the video signal; and determining whether the digitized image portion has a monochromatic content in excess of a predetermined threshold.

13. The method of claim 12, comprising the steps of:

receiving a control track signal during said playing step; and, prior to performing said detecting step;

comparing the control track signal with a predetermined signal corresponding approximately to an insert location.

14. The method of claim 11, comprising:

storing an image of one of said common scenes prior to said playing step; and generating a scene transition effect between said common scene and the inserted custom image.

15. The method of claim 11, comprising the steps of conducting said playing, detecting, and recording steps simultaneously on a plurality of preduplicated recordings.

16. A system for personalizing a plurality of preduplicated video recordings wherein each video recording comprises a plurality of common scenes separated by insert locations for insertion of custom information, the system comprising:

a master controller for storing personal data pertaining to a plurality of individuals and for correlating the personal data with custom information to associate selected custom information with each of said individuals and with each of the insert locations;

a plurality of video edit decks for playing and recording video recordings; and a plurality of process controllers, each process controller operatively connected with the master controller and with an associated edit deck, and each process controller comprising:

detector means connected for receiving a video signal, comprising an image signal, from the edit deck and for comparing the image signal with a predetermined criterion characteristic of an insert location;

digital storage means for storing the selected custom information to be recorded at the insert location;

retrieval means for retrieving the selected custom information in response to the detector means; and signal generation means responsive to the retrieval means for generating a video signal for recording by the edit deck.

17. The system of claim 16 comprising a robotic loader responsive to the master controller for loading a preduplicated tape into one of the edit decks prior to the recording of the custom information and for removing said preduplicated tape from the edit deck after the custom information has been recorded thereon.

18. In a process for producing customized video recordings, a method for synchronizing the playback of custom information for recording at insertion locations of a preduplicated video recording, comprising the steps of:

playing the preduplicated video recording to produce a video signal;

digitizing the video signal;

determining whether an image portion of the video signal contains an identifying predetermined image pattern indicating the beginning of an insertion location;

generating a custom information video signal when an insertion location has been determined; and recording the custom information video signal onto the preduplicated video recording at the insertion location.

19. The method of claim 18, comprising the steps of:

rewinding the video recording by a predetermined amount when the insertion location has been determined, and then replaying the video recording for said predetermined amount prior to said recording step.

20. The method of claim 18 comprising the steps of receiving a control track signal during said playing step, and then prior to said determining step comparing the control track signal with a predetermined signal indicating the approximate location of an insert location whereby the location of the insert location is more readily determined.

* * * * *